United States Patent
Moyer et al.

(10) Patent No.: US 6,769,076 B1
(45) Date of Patent: Jul. 27, 2004

(54) REAL-TIME PROCESSOR DEBUG SYSTEM

(75) Inventors: William C. Moyer, Dripping Springs, TX (US); Michael D. Fitzsimmons, Austin, TX (US); Richard G. Collins, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 09/498,812

(22) Filed: Feb. 7, 2000

(51) Int. Cl.[7] .............................................. G06F 11/00
(52) U.S. Cl. ........................................ 714/30; 714/37
(58) Field of Search ............................. 714/30, 43, 37, 714/31; 716/4; 717/124

(56) References Cited

U.S. PATENT DOCUMENTS

| | | | |
|---|---|---|---|
| 5,491,793 A | * | 2/1996 | Somasundaram et al. ...... 714/10 |
| 5,544,311 A | * | 8/1996 | Harenberg et al. ............ 714/30 |
| 5,771,240 A | * | 6/1998 | Tobin et al. ................. 714/30 |
| 5,978,937 A | * | 11/1999 | Miyamori et al. ............ 714/45 |
| 6,523,099 B1 | | 2/2003 | Namekawa |

* cited by examiner

Primary Examiner—Robert Beausoliel
Assistant Examiner—Marc Duncan
(74) Attorney, Agent, or Firm—James L. Clingan, Jr.

(57) ABSTRACT

A real-time processor debug system that selectively samples address and data signals of a virtual bus of a core processor during real-time operations to reduce power consumption and to minimize performance impact due to bus loading. Gating logic for an embedded processor provides the virtual bus signals of a core processor, including address and data signals, to a debug interface of an embedded system chip or integrated circuit (IC). The gating logic receives update data and update address signals from the debug interface to control switching on corresponding debug address and data buses. The core processor provides processor status signals to the debug interface so that the debug interface determines the particular transaction being performed by the core processor. The processor status signals indicate change of flow (COF) events as well as instruction fetch or data fetch cycles.

15 Claims, 4 Drawing Sheets

REAL-TIME PROCESSOR DEBUG SYSTEM

FIELD OF THE INVENTION

The present invention relates to a real-time processor debug system, and more particularly to a debug system that selectively samples address and data signals of a virtual bus of a core processor during real-time operation to reduce power consumption and to minimize performance impact due to bus loading.

BACKGROUND OF THE INVENTION

Embedded systems that contain a core processor, on-chip memory and an external memory interface module are commonplace. Current generation systems are integrating cache memories as well. System level code developers must write software or application code for the embedded systems to perform the particular functions necessary for the system. Most software must be revised several times by developers for various reasons, including adding or revising functionality, removing undesired features, and removing "bugs" or software errors. Thus, it is necessary during application code development to debug the software to ensure proper operation. The application code of an embedded system may further require ongoing, constant or periodic adjustment during operation. In some configurations, certain parameters, characteristic values or tables of constants may need adjustment or modification during real-time operation. The debug process as referred to herein includes initial application code development as well as real-time calibration or adjustment functions during operation.

Some legacy systems, including systems without a cache memory, provide the core processor bus externally so that core processor cycles are readily available for purposes of debugging. System level debug becomes more difficult in an embedded system environment with a cache memory since the pin or bus visibility of the core processor is no longer available. In particular, a cache memory is often positioned between the embedded core processor and the external physical bus so that the core processor bus is not externally available. For example, "show cycle" support is not an option as it was in prior embedded systems that did not have cache memories.

A traditional method of debug is referred to as background debug mode (BDM). BDM is a static debug process in which a processor is halted in order for a code developer to perform debug operations. A code developer may set break points for stopping the processor at specific points, or may single step through individual instructions to monitor the progress of the processor and identify problems and bugs. BDM is adequate for some applications but is not sufficient for real-time operations, including dynamic adjustment or calibration. Also, certain debug operations require that the application code be tested and corrected without stopping an embedded core processor. For example, an embedded processor system for controlling the engine of an automobile is usually debugged while the engine is running so that halting the core processor is not an option as it would effectively result in stopping the engine.

Dynamic debug methods are being developed to monitor processor operation without halting the processor. In those cases where the physical bus from the cache is externally available, it is not practical or feasible to also externally provide the core processor bus because it would result in an inordinate number of pins of the embedded processor. It is contemplated to develop a debug interface that monitors the processor bus and that provides messages via an internal auxiliary bus or port. Dynamic debug by monitoring the address and data buses between the core processor and cache can be a power-consuming and intrusive process. The bus between the cache and core processor is often referred to as a "virtual" bus. Large buffers coupled to the virtual bus cause bus loading, which can effect the performance of the embedded processor system. Further, the dynamic process of monitoring the address and data bus signals and providing corresponding messages to the external auxiliary bus consumes valuable power. Portable communication devices are typically hand-held and battery operated, and predominately use embedded processor systems. Such portable communication devices include, for example, personal digital assistant, (PDA), cell phones, pagers, global positioning (GPS) modules, etc. It is essential in such portable communication devices to minimize power consumption to conserve battery life.

It is equally important to minimize power consumption in systems which perform dynamic calibration during normal system operation. Automotive applications are an important example of this requirement. For example, in certain automotive applications, real-time calibration (constant) tuning requires the debug module to function as the processor and application are running. Minimizing power consumption of the embedded system is strongly desired.

It is desired to perform dynamic debug in a manner which minimizes power consumption and performance impact due to bus loading on the embedded processor system.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENTS

The Nexus Standard or GEPDIS (Global Embedded Processor Debug Interface Standard) is currently being developed to perform dynamic debug of embedded systems and to solve other problems and issues associated with real-time, non-intrusive debug support. GEPDIS, otherwise known as IEEE-ISTO Forum 5001(Institute of Electrical and Electronics Engineers-Industry Standards and Technology Organization), describes an embedded debug interface standard developed to standardize a methodology for non-intrusively debugging without halting a core of an embedded system processor. Many debug capabilities are defined in GEPDIS to monitor program execution by providing visibility into program flow and data flow. This visibility consists of a sequence of information messages provided over a dedicated multi-bit or multi-pin serial interface or auxiliary port to an external development system. Program flow messages are then combined with a static image of the program to reconstruct the actual instruction execution sequence of the embedded processor. Data flow messages track processor reads and writes to pre-defined address ranges.

GEPDIS dynamic debug is implemented using program trace messaging including synchronization messaging and data trace messaging. Implementation of program trace messaging requires monitoring the sequence of instruction fetches performed by the core processor in conjunction with status information which indicates change of flow (COF) events, including direct or indirect change of flow events. Direct COF events involve program counter relative branches and indirect COF events involve register indirect branches and exception vectoring. Implementation of program trace synchronization messages requires the currently executing instruction address or reasonable neighboring instruction address to be transmitted. Implementation of data trace messaging requires monitoring data access addresses and conditionally providing associated data. Data trace messaging includes read messaging or data reads within one or more defined address ranges and write messaging or data writes within one or more defined address ranges.

The GEPDIS purports to describe a real-time dynamic and non-intrusive debug system. GEPDIS contemplates an embedded debug interface that accesses the virtual bus and that corresponds with an external system via an auxiliary bus or port. However, GEPDIS does not specifically address bus loading and power consumption. Providing the virtual bus signals directly to the debug interface is very intrusive and may cause erroneous operation. Buffering may be used to reduce the debug interface impact, yet substantial performance impact may still result since all signal transitions of the virtual bus are reflected onto the debug signals. The power consumption on the debug bus is substantial and may even be excessive in certain embodiments.

Figure 1:
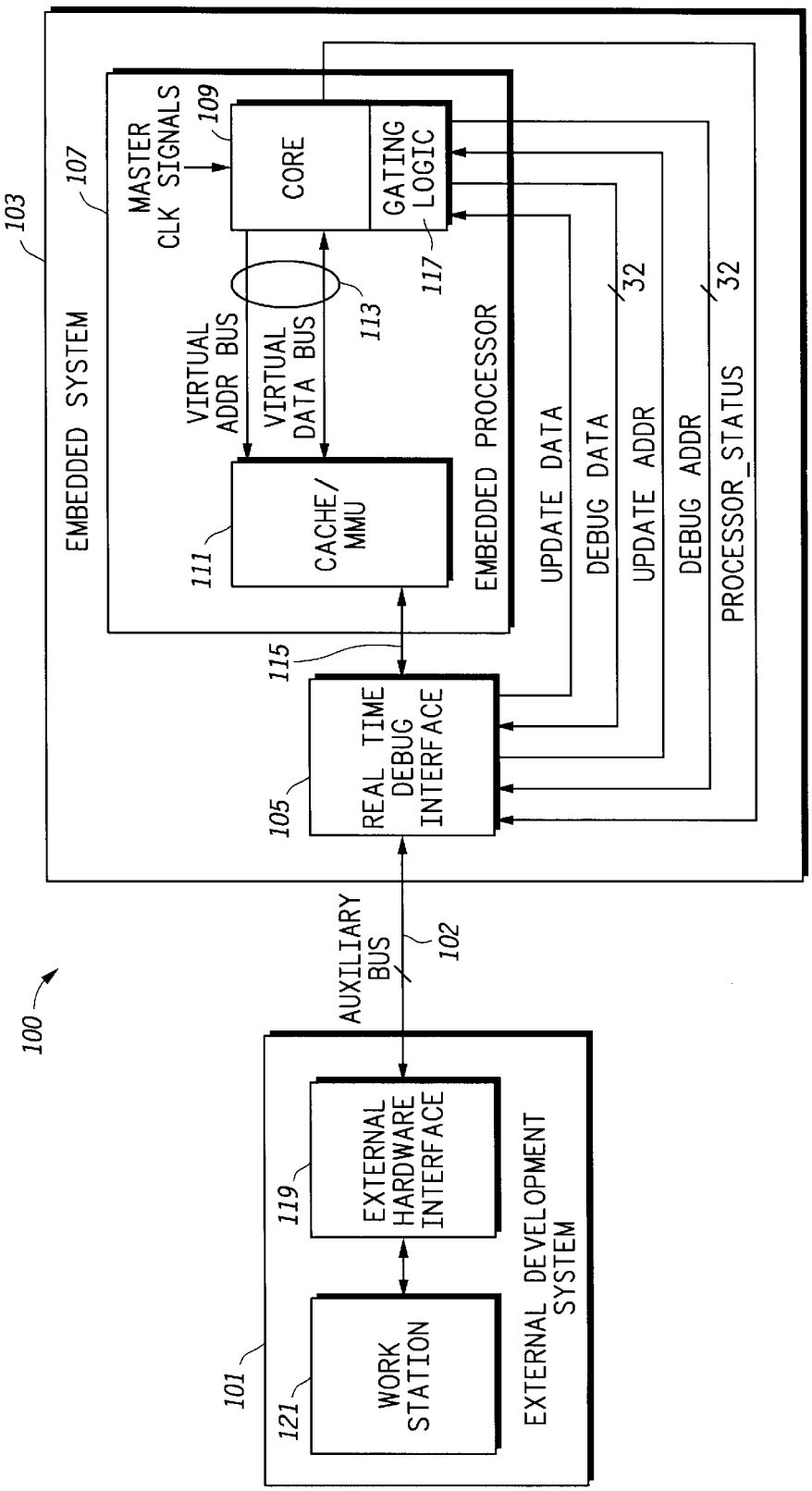
FIG. 1 is a schematic block diagram of a debug system that demonstrates a real-time processor debug system according to the present invention.

FIG. 1 is a schematic block diagram of a debug system 100 including an external development system 101 coupled to an auxiliary bus 102 of an embedded system 103. The development system 101 is used to perform real-time debugging operations of software being executed by a processor core 109 of an embedded processor 107 of the embedded system 103. It is understood, however, that a real-time calibration system (not shown) may also be coupled to the auxiliary bus 102 for purposes of performing real-time calibration, where principles of the present invention are the same.

In the embodiment shown, the embedded system 103 is incorporated onto an integrated circuit (IC) or chip and plugged into an appropriate socket on a board of a larger system, such as associated with the debug system 100. The embedded system 103 includes a real-time debug interface 105 coupled to the embedded processor 107 via a separate physical bus 115. The embedded processor 107 includes a central processing unit (CPU) or core 109 coupled via a virtual bus 113 to a cache/MMU (Memory Management Unit) 111. The virtual bus 113 includes a plurality of operating signals defining the operation of the core 109. The cache and MMU are typically separate systems, but are shown combined for purposes of simplicity of illustration. An MMU is optional and may not be provided on particular embodiments of the embedded processor 107. The present invention contemplates many different variations and embodiments of an embedded processor and is not limited by such variations.

The virtual bus 113 includes a VIRTUAL ADDR bus comprising address signals asserted by the core 109 to the cache/MMU 111 and a bi-directional VIRTUAL DATA bus between the core 109 and the cache/MMU 111. The term "virtual" denotes that the virtual bus 113 is not visible or otherwise is not provided externally to the embedded processor 107 to other components of the embedded system 103. The physical bus 115 is similar to the virtual bus 113 and includes similar address data and control signals, but operation between the two buses varies during operation. The cache within the cache/MMU 111 may be disabled in which case the virtual bus 113 operates in a similar manner as the physical bus 115. If the cache is enabled, however, the physical bus 115 operates in a different manner and does not give a true representation of the operation of the core 109. It is desired to monitor the virtual bus 113 to monitor the operation of the core 109 or to debug or otherwise perform calibration operations of application software being executed by the core 109.

The virtual bus 113 is provided to virtual bus gating logic 117 coupled to the core 109. The virtual bus gating logic 117 may be incorporated within the core 109 or may be designed externally from the core 109. The virtual bus gating logic 117 is coupled to the real-time debug interface 105 via an UPDATE DATA signal, an UPDATE ADDR signal, a DEBUG DATA bus and a DEBUG ADDR bus. The DEBUG ADDR bus may include attribute signals further described below. The UPDATE DATA signal is a data debug update signal that selectively activates or otherwise enables signals on the DEBUG DATA bus, and the UPDATE ADDR signal is an address debug update signal that selectively enables or activates the DEBUG ADDR bus. PROCESSOR STATUS signals generated by the core 109 are provided to the real-time debug interface 105 to identify certain status events of the core 109, as further described below. The PROCESSOR STATUS signals include at least one core transaction status output signal that indicates the transaction status of the core 109.

The auxiliary bus 102 is a scalable output debug port controlled by the real-time debug interface 105 of the embedded system 103. In one embodiment, the auxiliary bus 102 is defined by GEPDIS to enable monitoring of the core 109 by the development system 101. The auxiliary bus 102 is provided to an external hardware interface 119, which comprises buffers firmware, processing and the like, for providing debug signals to a development work station 121 within the development system 101. The work station 121 incorporates any firmware, hardware or software and may be implemented as a personal computer or the like for controlling debug operations or the development of application software. An operator at the workstation 121 interfaces with debug software for controlling operations of the real-time debug interface 105 for monitoring the address and data signals of the virtual bus 113 among other activity.

The embedded system 103 may have several modes of operation including a normal mode for normal operations and a debug mode. The real-time debug interface 105 facilitates the debug mode and may have several selectable modes as subsets of the debug mode. For example, the real-time debug interface includes program trace mode and data trace mode, where data trace mode may further have read and write debug modes.

Figure 2:
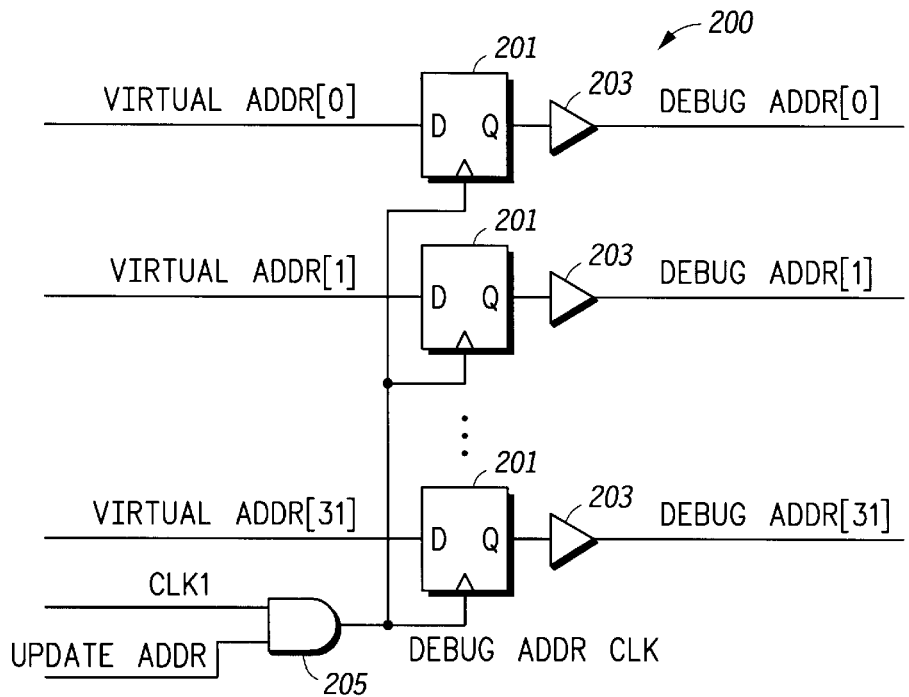
FIG. 2 is a schematic diagram of virtual address bus gating logic implemented according to an embodiment of the present invention.

FIG. 2 is a schematic diagram of virtual address bus gating logic 200 according to an embodiment of the present invention. The virtual address bus gating logic 200 is provided within the virtual bus gating logic 117 for coupling the VIRTUAL ADDR bus of the virtual bus 113 to the DEBUG ADDR bus. In the embodiment described herein, the VIRTUAL ADDR bus includes 32 separate address signals labeled VIRTUAL ADDR [31:0]. It is understood, however, that the present invention is not limited to any particular number of address signals. Each VIRTUAL ADDR bus signal is provided to a corresponding input of a series of latches 201, which may be any suitable type of latches such as D-type latches. The Q output of each of the latches 201 is provided to a respective input of a series of buffers 203. The outputs of the buffers 203 assert the respective signals of the DEBUG ADDR bus, including individual signals DEBUG ADDR [31:0]. The embedded processor 107 includes an internal master clock signal, referred to as CLK1, which is provided to one input of a two-input AND gate 205. The CLK1 signal is at least one master clock signal that is provided to the core 109 for control and timing purposes. The other input of the AND gate 205 receives the UPDATE ADDR signal. The output of the AND gate 205 asserts a signal DEBUG ADDR CLK, which is provided to the clock input of each of the latches 201.

In operation, the UPDATE ADDR signal serves as an enable signal to transfer the respective signals of the VIRTUAL ADDR bus to the DEBUG ADDR bus synchronized with assertions of the CLK1 signal. In this manner, when the UPDATE ADDR signal is asserted, then the CLK1 signal clocks the latches 201 to latch the VIRTUAL ADDR [31:0] signals to the respective signals of the DEBUG ADDR [31:0] signals. When the UPDATE ADDR signal is negated or logic zero, then the latches 201 are static so that the DEBUG ADDR [31:0] signals remain stable. It is noted that transitions of any of the buses of the embedded processor 107, including the DEBUG ADDR bus, consumes a substantive amount of power. As described further below, use of the UPDATE ADDR signal to reduce or eliminate unnecessary transitions of the DEBUG ADDR bus achieves significant power savings.

Figure 3:
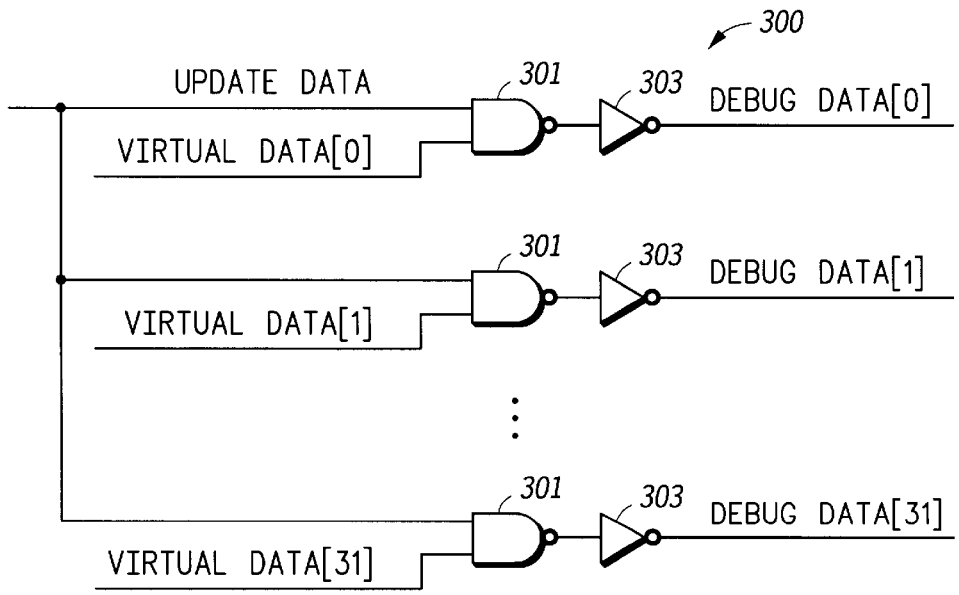
FIG. 3 is a schematic diagram of virtual data bus gating logic implemented according to an embodiment of the present invention.

FIG. 3 is a schematic diagram of virtual data bus gating logic 300 implemented according to an embodiment of the present invention. The virtual data bus gating logic 300 is also incorporated into the virtual gating logic 117 for selectively conveying respective data signals of the virtual bus 113 to the DEBUG DATA bus. In the embodiment shown, the VIRTUAL DATA bus of the virtual bus 113 includes 32 signals, VIRTUAL DATA [31:0]. Also, the DEBUG DATA bus comprises 32 signals, DEBUG DATA [31:0]. It is understood, however, that the present invention is not limited to any particular number of data signals. The UPDATE DATA signal is provided to one input of each of a plurality of two-input NAND gates 301. The other input of each of the NAND gates 301 receives a respective one of the VIRTUAL DATA [31:0] signals. For example, a first NAND gate 301 receives the VIRTUAL DATA [0] signal, a second NAND gate 301 receives the VIRTUAL DATA [1] signal, etc. The output of each of the NAND gates 301 is provided to the input of a respective one of a plurality of inverters 303. Each of the inverters 303 asserts a respective one of the individual signals of the DEBUG DATA [31:0] signals at their respective outputs.

Operation of the virtual data bus gating logic 300 is similar to the VIRTUAL ADDRESS bus gating logic 200 except without synchronization to the CLK1 signal. It is understood, however, that the virtual address bus gating logic 200 may be implemented in a similar fashion as the virtual data bus gating logic 300 and vice versa. In the particular embodiment described herein, the virtual address bus gating logic 200 delays the address somewhat to ensure that the cycle was actually valid and latched appropriately. A further benefit is that the timing of the DEBUG ADDR bus and signals is less critical, so that the buffers 203 may be implemented using smaller and less power consuming devices. When the UPDATE DATA signal is negated low, then the DEBUG DATA bus remains static and unchanged. When the UPDATE DATA signal is asserted high, then the DEBUG DATA bus logically follows the VIRTUAL DATA bus of the virtual bus 113 after slight delay through the logic gates 301, 303. In particular, when the UPDATE DATA signal is asserted high, the DEBUG DATA [0] signal follows the virtual data [0] signal, the DEBUG DATA [1] signals follows the virtual data [1] signal, etc.

It is understood that the virtual address bus gating logic 200 and the virtual data bus gating logic 300 provide selective control and activation of the corresponding DEBUG ADDR bus and the DEBUG DATA bus via the UPDATE ADDR signal and the UPDATE DATA signal, respectively. In this manner, the UPDATE ADDR and UPDATE DATA signals may be utilized to control the power consumption of the DEBUG ADDRESS and DEBUG DATA buses. This, in turn, enables control of the power consumption of the embedded system 103 during debug, testing or calibration operation. In particular battery-operated and portable devices, such as pagers and mobile phones and the like, the debug mode is disabled in normal operating mode. The UPDATE ADDR and UPDATE DATA signals are forced low to ensure that the DEBUG ADDR and DEBUG DATA buses do not switch. This ensures that the additional debug mode logic or circuitry does not consume valuable battery power and thus will not effect battery life.

The real-time debug interface 105 asserts the UPDATE DATA and UPDATE ADDR signals when necessary to sample the debug signals of the DEBUG DATA bus and DEBUG ADDR bus. Also, various attribute signals are provided from the core 109 to the real-time debug interface 105 shown as the PROCESSOR STATUS signals. The real-time debug interface 105, under control of the development system 101, determines when to assert the UPDATE DATA and the UPDATE ADDR signals to activate or otherwise enable the DEBUG DATA and DEBUG ADDR signals for monitoring by the real-time debug interface 105. In particular embodiments, the real-time debug interface 105 may activate or otherwise enable program trace for monitoring the sequence of instruction fetches performed by the core 109 during change of flow (COF) events. The PROCESSOR STATUS signals indicate a COF status while the virtual address bus of the virtual bus 113 asserts a COF address. During a COF status or event, as indicated by the PROCESSOR STATUS signals, the real-time debug interface 105 asserts the UPDATE ADDR signal to activate and sample the DEBUG ADDR bus. Synchronization messages may also be part of program trace operation in which the real-time debug interface 105 asserts the UPDATE ADDR signal.

Data trace messages involve monitoring data access addresses and conditionally providing associated data. Data trace is useful for data reads or writes within any one of one or more defined address ranges. When data trace messaging is enabled, the real-time debug interface 105 monitors the PROCESSOR STATUS signals for data fetches involved in both read or write cycles. The PROCESSOR STATUS signals also indicates whether a read or write cycle is occurring. For either read or write messaging, the real-time debug interface 105 asserts the UPDATE ADDR signal during a data fetch to capture the corresponding address during an appropriate data cycle. For example, for read messaging, the real-time debug interface 105 asserts the UPDATE ADDR signal if the processor status bus indicates a read cycle. Likewise, the real-time debug interface 105 asserts the UPDATE ADDR signal if the processor status bus indicates a write cycle for write messaging. Of course, the real-time debug interface 105 asserts the UPDATE ADDR signal for both read and write signals if both read and write messaging are enabled. Also, when data trace is enabled, the real-time debug interface 105 compares the retrieved address from the DEBUG ADDR bus with any of the one or more defined address ranges for read or write messages. If an address match is found for a read or write cycle, then the real-time debug interface 105 asserts the UPDATE DATA signal causing the virtual bus gating logic 117 to assert the corresponding data on the DEBUG DATA bus.

Figure 4:
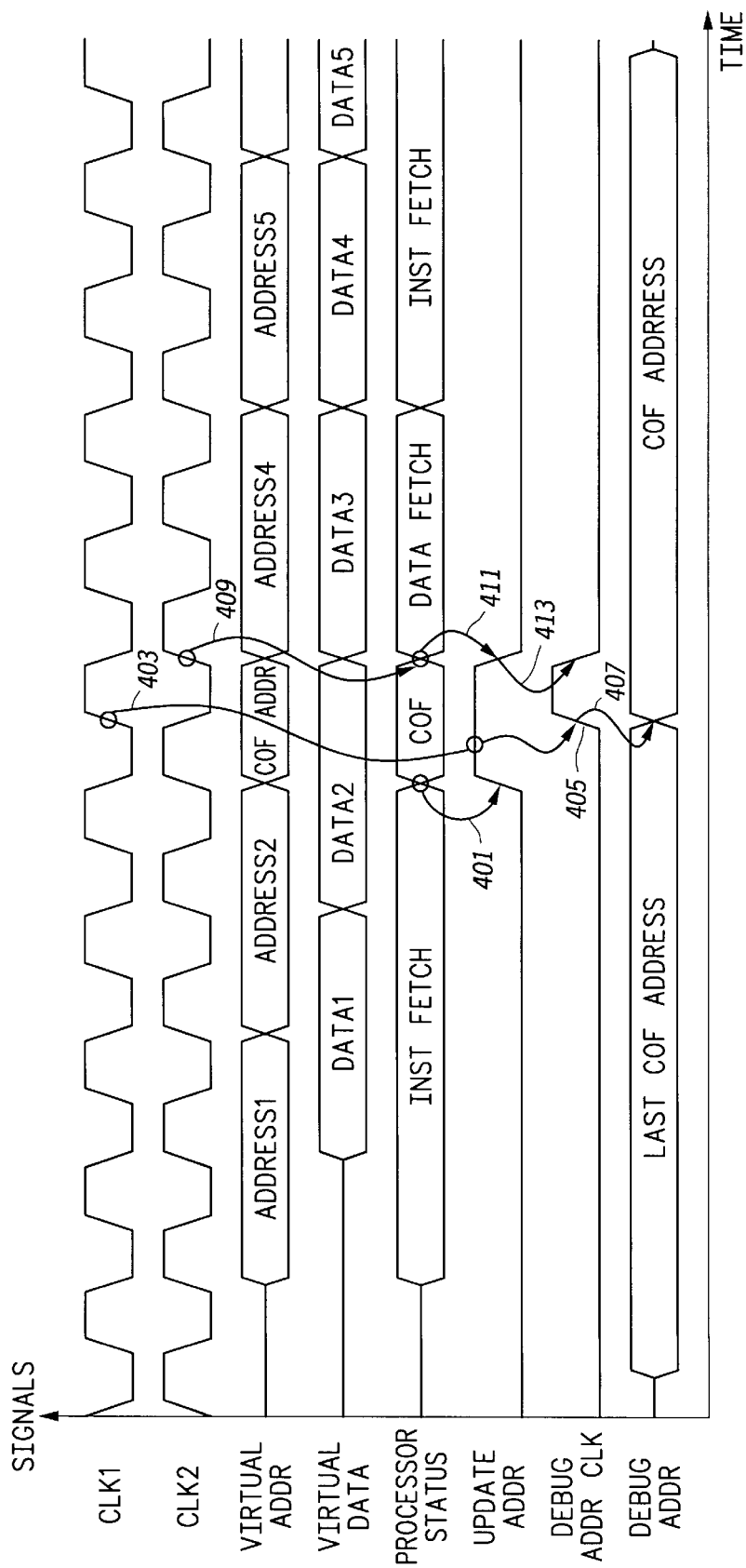
FIG. 4 is a timing diagram illustrating program trace virtual address gating operation of a real-time debug interface system according to an embodiment of the present invention.

FIG. 4 is a timing diagram illustrating program trace virtual address gating operation according to an embodiment of the present invention. Core 109 master clock signals CLK1 and CLK2 are shown as timing references for the embedded system 103. The timing diagram shows the VIRTUAL ADDR bus of the virtual bus 113 illustrating assertion of five addresses labeled ADDRESS1, ADDRESS2, COF ADDR, ADDRESS4, and ADDRESS5. The timing diagram also shows the VIRTUAL DATA bus illustrating five corresponding data signals individually shown as DATA1, DATA2, DATA3, DATA4, and DATA5. The PROCESS STATUS signals are also shown illustrating an instruction fetch followed by COF event, followed by a data fetch, and then by another instruction fetch. The timing diagram also shows the UPDATE ADDR signal, the DEBUG ADDR CLK signal and the DEBUG ADDR bus.

In the example of FIG. 4, the program trace is enabled while data trace is disabled. Since data trace is disabled, there is no need to monitor data on the VIRTUAL DATA bus. Thus, the real-time debug interface 105 keeps the UPDATE DATA signal negated low so that the DEBUG DATA bus remains static and inactive, regardless of activity on the VIRTUAL DATA bus. This provides the immediate benefit of significant reduction in power consumption in that power is not needlessly consumed switching the DEBUG DATA bus.

The real-time debug interface 105 does not need to monitor all activity on the VIRTUAL ADDR bus. Many addresses asserted on the VIRTUAL ADDR bus are incremented versions of the previously asserted address. In this manner, once an initial address of a series of sequential addresses is known, the remaining addresses are known or otherwise predictable so that they need not be transferred to the DEBUG ADDR bus. This is true for any addressing scheme including schemes in which sequential addresses are not necessarily incremented, as long as the binary sequence is known. The real-time debug interface 105 need only identify and read addresses that do not follow the sequential order, such as in response to conditional or unconditional branch or loop instructions or any direct or indirect COF events. The COF instruction asserted on the PROCESSOR STATUS signals identifies non-sequential addresses.

As shown in FIG. 4, the DEBUG ADDR bus remains static with the last COF address even though sequential addresses ADDRESS1 and ADDRESS2 are asserted on the VIRTUAL ADDR bus. In particular, when the real-time debug interface 105 detects a COF instruction on the PROCESSOR STATUS signals, it asserts the UPDATE ADDR signal as indicated by event arrow 401. Assertion of the UPDATE ADDR signal enables the latches 201 shown in FIG. 2. Upon the next rising edge of the CLK1 signal while the UPDATE ADDR signal is asserted, as shown by event arrow 403, the DEBUG ADDR CLK signal is asserted as indicated at 405. Assertion of the DEBUG ADDR CLK signal enables the latches 201, so that the VIRTUAL ADDR bus signals are driven onto the DEBUG ADDR bus signals as shown by an event arrow 407.

In this manner, the DEBUG ADDR bus only switches from the last COF address to the new COF address in response to the UPDATE ADDR signal asserted by the real-time debug interface 105. The COF instruction on the PROCESSOR STATUS signals is completed upon the next rising edge of the CLK2 signal as indicated by an event arrow 409. The real-time debug interface 105 de-asserts the UPDATE ADDR signal in response to completion of the COF instruction as indicated by event arrow 411. In response, the DEBUG ADDR CLK signal is negated as shown by event arrow 413. Since the DEBUG ADDR CLK signal remains negated thereafter, the DEBUG ADDR bus remains unchanged and static with the new COF address, thereby reducing power.

Figure 5:
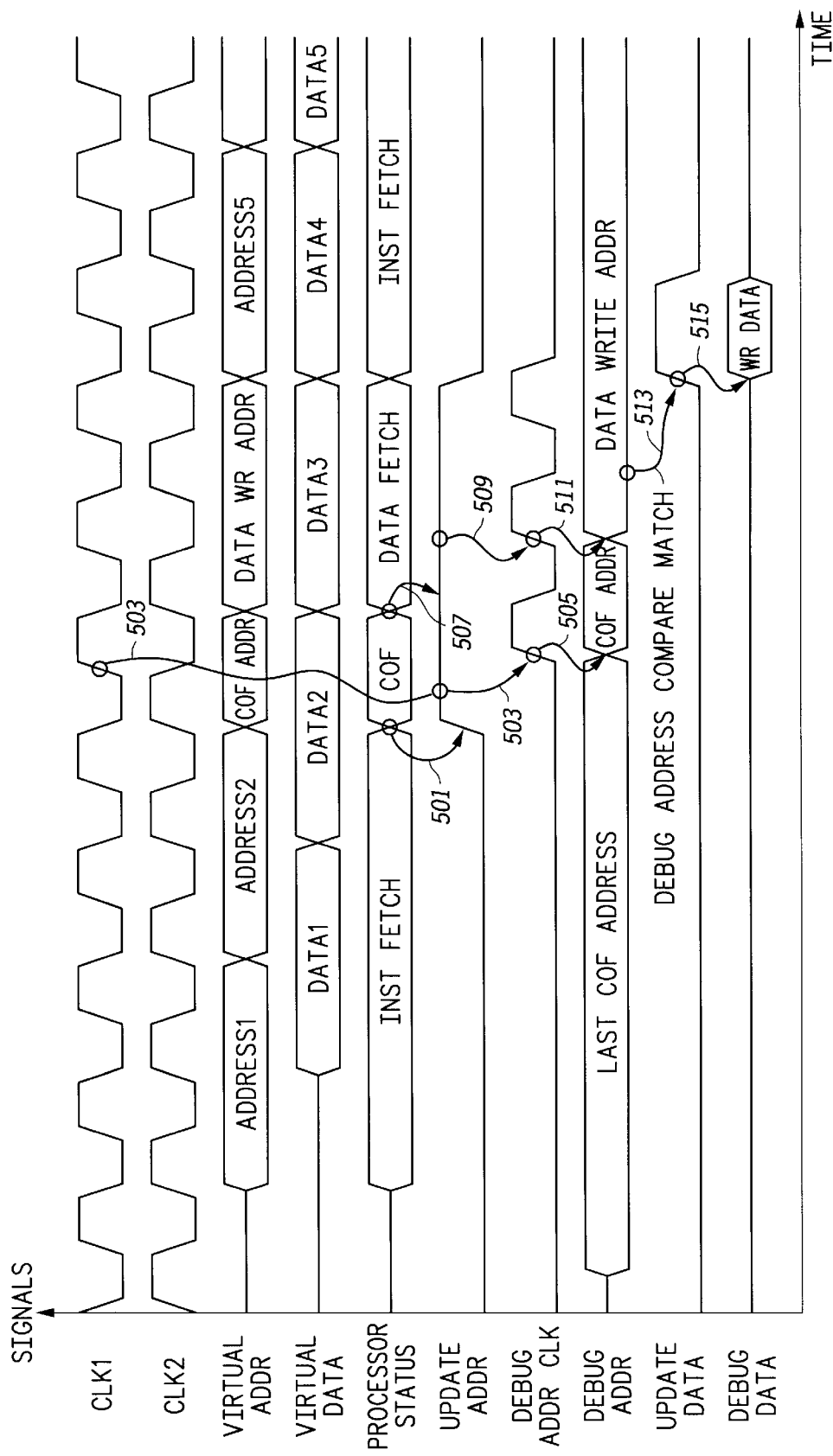
FIG. 5 is a timing diagram illustrating program and data trace virtual address and data gating operation of a real-time debug interface system according to an embodiment of the present invention.

FIG. 5 is a timing diagram illustrating program and data trace virtual address and data gating according to an embodiment of the present invention. In this example, both program trace and data trace are enabled. Since program trace is enabled, the real-time debug interface 105 monitors the VIRTUAL ADDR bus upon assertions of the COF instruction as previously described with reference to FIG. 4. Since data trace is enabled, and assuming both read and write data trace are enabled, then the real-time debug interface 105 monitors significant data events occurring on the VIRTUAL DATA bus. The significant data events are defined by the work station 121 and conveyed to the real-time debug interface 105 for monitoring. It may be desired, for example, to identify any data written into or read from a particular register at a particular address, or a plurality of registers or any other type of memory device within a particular address range. Multiples of such addresses or address ranges may be defined.

The real-time debug interface 105 monitors the PROCESSOR STATUS signals for any DATA FETCH instructions while data trace is enabled. When a DATA FETCH instruction is detected, the real-time debug interface asserts the UPDATE ADDR signal to capture the read or write address from the VIRTUAL ADDR bus onto the DEBUG ADDR bus. The real-time debug interface 105 then compares the address retrieved from the DEBUG ADDR bus with any and all applicable addresses or address ranges being monitored. If the address is equal to a monitored address or address range, then the real-time debug interface 105 asserts the UPDATE DATA signal to cause transfer of the data asserted on the VIRTUAL DATA bus to the DEBUG DATA bus if the data event is significant. It is noted that if both read and write are being monitored for the particular address range, then the data event is considered significant. Otherwise, the data event is significant only if the type of cycle being executed is the same as the type of cycle being monitored.

The real-time debug interface 105 also determines from the PROCESSOR STATUS signals whether the data cycle is read or write. If only read data trace is enabled and a write cycle is detected, or vice versa, is then the real-time debug interface 105 may not assert the UPDATE ADDR signal since the data event is not considered significant. Even if read and write data trace is enabled, it may be necessary to distinguish between a read or write cycle for the particular address range. For example, it may be desired to identify a read cycle from one address range and a write cycle to a second different address range. In one embodiment, the compare logic within the real-time delay interface 105 uses the cycle type to determine the applicable monitored address ranges. Of course, if read and write is enabled for all defined address ranges, then it may be unnecessary to distinguish between read and write cycles.

As shown in FIG. 5, a COF instruction appears on the PROCESSOR STATUS signals, which is detected by the real-time debug interface 105. The real-time debug interface 105 correspondingly asserts the UPDATE ADDR signal as indicated by event arrow 501. While the UPDATE ADDR signal is asserted, assertions of the CLK1 signal cause concomitant assertions of the DEBUG ADDR CLK signal as indicated by event arrow 503. A subsequent assertion of the CLK2 signal causes a transition on the PROCESSOR STATUS signals from a COF instruction to a DATA FETCH instruction. The DATA FETCH instruction on the PROCESSOR STATUS signals is detected by the real-time debug interface 105, which maintains the UPDATE ADDR signal asserted as indicated by event arrow 507 since in this example data trace is enabled. Since the UPDATE ADDR signal remains asserted, a second assertion of the DEBUG ADDR CLK signal causes the data write address appearing on the VIRTUAL ADDR bus to be latched to the DEBUG ADDR bus as indicated by event arrow 511. Since data trace is enabled, the data write address (DATA WR ADDR) asserted on the DEBUG ADDR bus is retrieved by the real-time debug interface 105, which compares the retrieved address with any particular defined address ranges for read or write messaging that is activated at that time. In the example shown in FIG. 5, the real-time debug interface 105 compares the data write address with the active address ranges and determines a debug address compare match and correspondingly asserts the UPDATE DATA signal as indicated by event arrow 513. The assertion of the UPDATE DATA signal by the real-time debug interface 105, causes the signals on the VIRTUAL DATA bus to be transferred to the DEBUG DATA bus via logic gates 301, 303 resulting in write data asserted on the DEBUG DATA bus as indicated by event arrow 515.

It is appreciated that the logic gates 205, 301, the latches 201 and the buffers 203, 303 provide isolation which provides the benefit of reduced loading on the virtual bus 113. The use of the UPDATE ADDR and UPDATE DATA signals to reduce switching of the DEBUG ADDR and DEBUG DATA buses further provides benefits of reduced loading of the virtual bus 113 and also substantial power savings for the embedded processor 107 and thus the embedded system 103.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. An integrated circuit, comprising:
a core processor for providing an operating signal during normal operation of the core processor;
a logic circuit having an input for receiving the operating signal, a second input for receiving a debug update signal, and an output; and
a real-time debug circuit having a first output providing the debug update signal, a first input coupled to the output of the logic circuit, and a second output coupled to an auxiliary bus accessible external to the integrated circuit;
wherein the integrated circuit has a debug mode and the real-time debug circuit has a selectable mode as a subset of the debug mode.

2. The integrated circuit of claim 1, wherein the debug update signal is asserted during the selectable mode.

3. The integrated circuit of claim 2, wherein the core processor generates processor status signals to the real-time debug circuit and the debug update signal is asserted in response to the processor status signals indicating a processor address change of flow.

4. The integrated circuit of claim 2, wherein the core processor generates processor status signals to the real-time debug circuit and the debug update signal is asserted in response to the processor status signals indicating a processor data access.

5. A real-time debug system, comprising:
a core processor having a first output comprising a virtual address bus and a second output providing a core transaction status output signal, wherein the core processor further comprises a second output comprising a virtual address bus;
a first logic circuit having a first input coupled to the virtual address bus, an output as a debug address bus, and a second input;
a debug circuit for asserting an address debug signal to the second input of the logic circuit when the processor status output signal indicates an address change of flow; and
a second logic circuit having a first input coupled to the virtual data bus, an output as a debug data bus, and a second input; and wherein the debug circuit asserts a data debug signal to the second input of the second logic circuit when the processor status output signal indicates a data access.

6. The real-time debug system of claim 5, wherein the second logic circuit couples the virtual data bus to the debug data bus in response to the data debug signal being asserted.

7. The real-time debug system of claim 6, wherein the debug circuit is coupled to the debug data bus.

8. In a real-time debug system in an integrated circuit having a debug circuit and a core processor which generates operating signals for internal use of the integrated circuit, a method comprising the steps of:
entering a debug mode during normal operation of the integrated circuit;
entering a selectable mode which is a subset of the debug mode;
coupling the operating signals to the debug circuit in response to the debug circuit asserting a debug signal during the selectable mode; and blocking the operating signals from the debug circuit in response to the debug circuit de-asserting the debug signal during the selectable mode.

9. An integrated circuit comprising:
a core processor having an output which is provided only internal to the integrated circuit during normal operation; and a logic circuit having a first input coupled to the output of the core processor, a debug output, and a second input for preventing the logic circuit from switching a logic state of the debug output in response to a debug signal being de-asserted.

10. The integrated circuit of claim 9, wherein the output is a virtual address bus and the debug output is a debug address bus.

11. The integrated circuit of claim 9, wherein the output is a virtual data bus and the debug output is a debug data bus.

12. The integrated circuit of claim 9, further comprising a debug circuit having an input coupled to the debug output and a first output for providing the debug signal.

13. The integrated circuit of claim 12, wherein the debug circuit has a second output coupled to an auxiliary bus, the auxiliary bus being accessible externally from the integrated circuit.

14. The integrated circuit of claim 13, wherein the core processor is responsive to a master clock and wherein the logic circuit comprises:

a first logic gate having a first input coupled to the master clock, a second input coupled to the debug signal, and an output; a flip-flop having signal input coupled to the output of the core processor, a clock input coupled to the output of the first logic gate, and an output being the debug output.

15. The integrated circuit of claim 13, wherein the logic circuit comprises a logic gate having a first input coupled to the output of the core processor, a second input coupled to the debug signal, and an output being the debug output.

* * * * *